United States Patent Office 3,709,823
Patented Jan. 9, 1973

3,709,823
METHOD OF MANUFACTURING HIGHLY VISCOUS, ACIDIC BASE MATERIALS FOR DETERGENTS
Yujiro Sugahara, Tokyo, and Masanori Tanaka, Shibata, Japan, assignors to Mizusawa Industrial Chemicals, Ltd., Osaka, Japan
No Drawing. Filed June 16, 1970, Ser. No. 46,837
Int. Cl. B01j *13/00;* C11d *3/08*
U.S. Cl. 252—136                    4 Claims

ABSTRACT OF THE DISCLOSURE

Method of manufacturing highly viscous, acidic base materials for detergents by converting silica hydrogel or silica alumina hydrogel into a hydrosol with water by the technique of wet grinding, and contacting the thus obtained hydrosol with mineral acid, thereby regulating the mineral acid content of said hydrosol to from 3 to 20% by weight.

BACKGROUND OF THE INVENTION (a) Field of the invention

The present invention relates to a method of manufacturing a strong acidic silica sol to be used as detergent base materials and more particularly to a method of manufacturing a highly viscous and strongly acidic silica sol by the use of silica hydrogel or silica alumina hydrogel as raw materials.

(b) Description of the prior art

It has been said that there are two important requisites in the use of silica sol as a detergent base material, namely, (1) it must exhibit a high viscosity under a strongly acidic medium of and (2) it must too be capable of maintaining a high viscosity, even if the content of silica is small. However, under existing circumstances, it is impossible to prepare silica sol satisfying the aforesaid two serious important requisites at the same time by the conventional methods of manufacturing silica sol. The conventional methods of manufacturing silica sol include using a silica xerogel prepared by the vapour phase process, for instance Aerosil, and hydrochloric acid etc. However, the silica sol obtained by this method, generally lacks a sufficient viscosity under a strongly acidic medium and the content of silica must be exceedingly increased in order to increase this viscosity.

SUMMARY OF THE INVENTION

The inventors have carried on studies to obtain silica sol which satisfies the above-described two important requisites simultaneously. It has been discovered that when silica hydrogel is subjected to wet grinding into fine particles, thereby being changed into the state of a hydrosol, and this sol is contacted with strong mineral acids such as hydrochloric acid, sulfuric acid and nitric acid, the silica hydrosol contains a large amount of strong acid, as the result of which there is obtained a highly viscous silica sol. When the usual silica gel prepared by the vapour phase process is dispersed in water, in an amount of 2.2 wt. percent of silica and 9.0 wt. percent of hydrochloric acid, the coefficient of viscosity of the dispersed liquid is 120 cp. measured by a Brookfield viscometer. However, when silica hydrogel is subjected to wet grinding with water, the silica content of the resulting silica hydrosol is 6 wt. percent, and the coefficient of viscosity of this silica hydrosol is 40 cp. It, furthermore, has been found that when concentrated hydrochloric acid and fresh water or diluted hydrochloric acid is added to the silica hydrosol so that the silica concentration thereof is 2.2 wt. percent and the hydrochloric acid concentration is 9.0 wt. percent, the coefficient of viscosity of the silica hydrosol increases up to a high value of 410 cp.

The inventors have carried on further experiments and have discovered that when silica hydrogel is mixed with hydrochloric acid so that the concentration of silica is 2.2 wt. percent and the concentration of hydrochloric acid is 9.0 wt. percent and the thus obtained substance is subjected to wet grinding, the coefficient of viscosity thereof is 290 cp., whilst that of a substance prepared from a xerogel in the same manner is 15 cp.

Furthermore, the tendency as described above has been observed in respect of the viscosity changes when the silica concentration is in the range of from 0.5 wt. percent to 5.0 wt. percent. Still further, the same tendency has been also observed with regard to the viscosity changes when the hydrochloric acid concentration is in the range of from 3 to 20 wt. percent.

As is clear from above-mentioned three experimental examples, the substances prepared by the use of silica hydrogel all demonstrate a high coefficient of viscosity compared with those prepared by xerogels. The substance prepared by first wet grinding hydrogel with water and then adding hydrochloric acid thereto demonstrates the highest coefficient of viscosity.

Referring now to the grinding conditions in these examples, when silica hydrogel or silica alumina hydrogel is subjected to wet grinding with water, while holding the pH value at 7, the material being ground has a high coefficient of viscosity, so that the concentration of silica in the material capable of being ground is less than 3 wt. percent. When the pH value is held at 3, the concentration of silica in the material capable of being ground is 6 wt. percent, and furthermore when the pH value is held at from 1 to 2, the said silica concentration can be made 8 wt. percent.

The above-mentioned facts boil down to this, i.e., that the choice of pH at the time of wet grinding makes it possible to increase or decrease the concentration of silica during the time when wet grinding is being conducted. This is an important matter in respect of making efficient use of the grinder when wet grinding is carried out.

Further, when the pH value of the material being ground is made less than 1 by increasing the concentration of strong acid and adding an amount without measuring the pH, for instance more than 2 wt. percent of hydrochloric acid, the coefficient of viscosity of the material being ground increases and it is difficult to raise the silica concentration.

As described above, whichever way the silica sol substance may be made, wherein silica hydrogel and silica alumina hydrogel are subjected to wet grinding with water or strong acid, there can be produced a fine silica sol containing a large amount of strong acid as compared with that obtained by using a silica gel prepared by the vapour phase process.

When salts, for instance various kinds of metallic salts such as NaCl, KCl, $CaCl_2$, $MgCl_2$, $AlCl_3$ etc., are incorporated in the strong acid silica sol solution thus obtained, the coefficient of viscosity increases. When there is further added a surface active agent, for instance a cation surface activator such as a quaternary ammonium salt, etc., this sticky liquid, exhibits the characteristics of detergent base materials but without precipitating silica, even after being allowed to stand for a long period of time and without losing its thixotropic properties. This is because the silica hydrogel is rich in hydrous qualities and can contain a large amount of strong acid solution. These are important characteristics which are not observed with silica xerogel prepared by the vapour phase process.

When preparing detergents by the use of the detergent base material made according to the present invention, there can be used any substance which does not exert a bad influence on the characteristics of the said base material. Especially, the addition of active constituents of a detergent, for instance alkylbenzenesulfonate, alkyl sulfonate, alkylsulfate, alkylpolyethylene glycol ether, alkylpolyethylene glycol ester etc. will bring about satisfactory effects.

DESCRIPTION OF THE PREFERRED EMBODIMENTS

Example 1

An unwashed silica hydrogel obtained by neutralizing sodium silicate with hydrochloric acid, a silica hydrogel and a silica alumina hydrogel obtained by neutralizing sodium silicate with mineral acid and thereafter washing with water, a silica xerogel obtained by neutralizing sodium silicate with mineral acid, washing with water and drying and a silica gel obtained by the vapour phase process were respectively put into a porcelain ball mill with water and were subjected to wet grinding at an $SiO_2$ concentration of 6 wt. percent to obtain raw silica sols. The respective raw silica sols were mixed with 32% hydrochloric acid and water to prepare strongly acidic silica sols having an $SiO_2$ content of 2.2 wt. percent and an HCl content of 9.0 wt. percent. The coefficient of viscosity and storage stability of these materials were as shown in Table 1.

As is clear from the results shown in Table 1, it can be recognized that when hydrochloric acid is added to the silica sols obtained by wet grinding silica hydrogel and silica alumina hydrogel, there can be prepared an exceedingly stable strongly acidic silica sol of the same or improved coefficient of viscosity as compared with that made of the silica gel prepared by the usual vapour phase process. Furthermore, it is recognized that, as is shown also in Example 4, the NaCl-containing silica hydrogel in the unwashed state can be used as a raw hydrogel.

Example 2

Sodium silicate, silica hydrogel, silica alumina hydrogel, silica xerogel and silica gel prepared by the vapour phase process were respectively put into a porcelain ball mill without previously being changed into a colloidal solution with water, and were mixed with hydrochloric acid and water, and thereafter they were subjected to wet grinding for 1 hour to obtain a strong acid silica sol having an $SiO_2$ content of 2.2 wt. percent and an HCl content of 9.0 wt. percent.

The coefficient of viscosity and storage stability were as shown in Table 2.

From Table 2, it will be observed that the strong acid silica sols obtained by wet grinding sodium silicate, silica hydrogel and silica alumina hydrogel in a hydrochloric acid solution are of the same or higher coefficient of viscosity as compared with that of the silica gel prepared by the usual vapour phase process, and are exceedingly superior in stability.

TABLE 2

| Name of raw material | Sodium silicate | Silica hydrogel | Silica alumina hydrogel | Silica xerogel | Silica gel by vapour phase process |
|---|---|---|---|---|---|
| Water content of raw gel (percent) | (1) | 880 | 880 | 4.1 | 1.8 |
| Conditions for preparing strong acid silica sol liquid: | | | | | |
| Constituents of grinding material: | | | | | |
| Raw gel (g.) | 80 | 183 | 183 | 23 | 22.5 |
| 32% hydrochloric acid (g.) | 308 | 281 | 305 | 281 | 281 |
| Water (g.) | 612 | 536 | 512 | 696 | 696.5 |
| Grinding time (hr.) | 1 | 1 | 1 | 1 | 1 |
| Coefficient of viscosity (cp.) | 270 | 290 | 340 | 15 | 120 |
| Storage stability | (2) | (2) | (2) | (3) | (4) |

1 $SiO_2$ percent (27.5 wt. percent).
2 Stable more than 3 months.
3 Formed precipitate in 1 day.
4 Stable for 2 months.

Example 3

Measurements were made in respect of the variations of the coefficient of viscosity of sols caused by variations of the silica concentration of the strongly acidic silica sols obtained in Examples 1 and 2 within the range of from 0.5 to 5 wt. percent. The results of measurements made by using the raw silica sols disclosed in Example 1 are shown in Table 3, and the results of measurements made using the gels in Example 2 are shown in Table 4. In these tests, the HCl concentration was maintained constant at 9.0 wt. percent.

Further measurements were made in the variations of the coefficient of viscosity caused by changing the concentration of hydrochloric acid within the range of from 3 to 20 wt. percent. The results of measurements made by using the raw silica sol liquid disclosed in Example 1 are shown in Table 5, and the results of measurements made by the use of the gels disclosed in Example 2 are shown in Table 6. In these tests, the silica concentration was maintained constant at 2.2 wt. percent.

TABLE 1

| Name of raw material | Unwashed silica hydrogel | Silica hydrogel | Silica alumina hydrogel | Silica xerogel | Silica gel by vapour phase process |
|---|---|---|---|---|---|
| Water content of raw gel (percent) 1 | 87.0 | 88.0 | 88.0 | 4.1 | 1.8 |
| Conditions for preparing raw silica sol: | | | | | |
| Raw gel (g.) | 460 | 500 | 500 | 62.5 | 61 |
| Water (g.) | 540 | 500 | 500 | 937.5 | 939 |
| Grinding time (hr.) | 1 | 1 | 1 | 1 | 1 |
| Constituents for preparing strong acid silica sol: | | | | | |
| Raw silica sol liquid (g.) | 367 | 367 | 367 | 367 | 367 |
| 32% hydrochloric acid (g.) | 281 | 281 | 281 | 281 | 281 |
| Water (g.) | 352 | 352 | 352 | 352 | 352 |
| Coefficient of viscosity (cp.) 2 | 450 | 410 | 850 | 15 | 120 |
| Storage stability 3 | (4) | (4) | (4) | (5) | (6) |

1 Dried at 110° C.
2 Measured with Brookfield viscometer.
3 The raw material was put into a tight stoppered 300-ml. reagent bottle, being let stand at room temperature, and thereafter observation was made in sedimentation.
4 Stable more than three months.
5 Formed precipitate in one day.
6 Stable for two months.

A tendency for the coefficient of viscosity for the respective raw materials to change in response to variations of silica concentration is noted as in Examples 1 and 2, but especially silica hydrogel and silica alumina hydrogel exhibit a tendency largely to increase the viscosity. Detergent base materials having various coefficients of viscosity can be manufactured in the range of from 0.5 to 5 wt. percent silica concentration.

Furthermore, the variation of hydrochloric acid content does not exert a considerable influence on the coefficient of viscosity, so that strongly acidic silica sol liquids containing various concentrations of hydrochloric acid can be prepared by using each of the raw materials.

TABLE 3

| Silica concentration (wt. percent) | Coefficient of viscosity (cp.) | | | | |
|---|---|---|---|---|---|
| | Unwashed silica hydrogel | Silica hydrogel | Silica alumina hydrogel | Silica xerogel | Silica gel by vapour phase process |
| 0.5 | 130 | 160 | 190 | | 80 |
| 1.5 | 240 | 280 | 470 | 5 | 100 |
| 2.2 | 450 | 410 | 850 | 15 | 120 |
| 3.5 | 810 | 860 | 2,250 | 70 | 540 |
| 5.0 | 1,580 | 1,940 | | 210 | 1,430 |

TABLE 4

| Silica concentration (wt. percent) | Coefficient of viscosity (cp.) | | | | |
|---|---|---|---|---|---|
| | Sodium silicate | Silica hydrogel | Silica alumina hydrogel | Silica xerogel | Silica gel by vapour phase process |
| 0.5 | 50 | 70 | 90 | | 10 |
| 1.5 | 110 | 130 | 160 | 10 | 80 |
| 2.2 | 270 | 290 | 340 | 15 | 190 |
| 3.5 | 520 | 550 | 660 | 40 | 410 |
| 5.0 | 1,090 | 1,220 | 1,770 | 150 | 1,160 |

TABLE 5

| Hydrochloric acid concentration (wt. percent) | Coefficient of viscosity (cp.) | | | | |
|---|---|---|---|---|---|
| | Unwashed silica hydrogel | Silica hydrogel | Silica alumina hydrogel | Silica xerogel | Silica gel by vapour phase process |
| 3.0 | 410 | 370 | 780 | 15 | 120 |
| 9.0 | 450 | 410 | 850 | 15 | 120 |
| 12.0 | 470 | 490 | 960 | 15 | 120 |
| 18.0 | 500 | 560 | 1,070 | 15 | 120 |

TABLE 6

| Hydrochloric acid concentration (wt. percent) | Coefficient of viscosity (cp.) | | | | |
|---|---|---|---|---|---|
| | Unwashed silica hydrogel | Silica hydrogel | Silica alumina hydrogel | Silica xerogel | Silica gel by vapour phase process |
| 3.0 | 260 | 290 | 340 | 15 | 190 |
| 9.0 | 270 | 290 | 340 | 15 | 190 |
| 12.0 | 270 | 300 | 350 | 15 | 190 |
| 18.0 | 290 | 320 | 380 | 15 | 190 |

Example 4

The coefficient of viscosity and storage stability were evaluated when sodium chloride was added to the strong acid silica sol obtained according to Examples 1 and 2. The results of measurements respecting the strong acid silica sol prepared by adding sodium chloride, water and 32% hydrochloric acid to the raw silica sol obtained in Example 1, said strong acid silica sol having $SiO_2$ 2.2 wt. percent, HCl 9.0 wt. percent and NaCl 7.0 wt. percent, are shown in Table 7, and the results of measurements concerning the strong silica sol prepared by adding sodium chloride, water and 32% hydrochloric acid to the raw gel which had not previously been changed into a colloidal solution, said strong silica sol having $SiO_2$ 2.2 wt. percent, HCl 9.0 wt. percent and NaCl 7.0 wt. percent, are given in Table 8.

As seen from the above-described results, when a strong acid silica sol is prepared by the use of sodium silicate, silica hydrogel and silica alumina hydrogel, by the addition of sodium chloride there can be obtained an exceedingly high viscosity of the strong acid silica sol in each instance. However, in the case of silica gel prepared by vapour phase process, the above-described effect is not manifested remarkably.

TABLE 7

| Name of raw material | Sodium silicate | Silica hydrogel | Silica alumina hydrogel | Silica xerogel | Silica gel by vapour phase process |
|---|---|---|---|---|---|
| Constituents for preparing strong acid silica sol: | | | | | |
| Raw silica sol liquid (g.) | 367 | 367 | 367 | 367 | 367 |
| Sodium chloride (g.) | 70 | 70 | 70 | 70 | 70 |
| 32% hydrochloric acid (g.) | 281 | 281 | 281 | 281 | 281 |
| Water (g.) | 282 | 282 | 282 | 282 | 282 |
| Coefficient of viscosity (cp.) | 710 | 708 | 1,130 | 10 | 150 |
| Storage stability | (1) | (1) | (1) | (2) | (3) |

1 Stable more than three months.
2 Formed precipitate in one day.
3 Stable for two months.

TABLE 8

| Name of raw material | Sodium silicate | Silica hydrogel | Silica alumina hydrogel | Silica xerogel | Silica gel by vapour phase process |
|---|---|---|---|---|---|
| Conditions for preparing strong acid silica sol liquid: | | | | | |
| Constituents of grinding material: | | | | | |
| Raw gel (g.) | 80 | 183 | 183 | 23 | 22.5 |
| Sodium chloride (g.) | 70 | 70 | 70 | 70 | 70 |
| 32% hydrochloric acid (g.) | 308 | 281 | 281 | 281 | 281 |
| Water (g.) | 542 | 466 | 466 | 626 | 626.5 |
| Grinding time (hr.) | 1 | 1 | 1 | 1 | 1 |
| Coefficient of viscosity (cp.) | 470 | 620 | 970 | 10 | 130 |
| Storage stability | (1) | (1) | (1) | (2) | (3) |

1 Stable more than 3 months.
2 Formed precipitate in 1 day.
3 Stable for 2 months.

Example 5

According to the process mentioned in Example 1, there was prepared a raw silica sol ($SiO_2$ 6 wt. percent) by using silica hydrogel obtained by the steps of neutralizing sodium silicate with mineral acid and washing the same with water, and to said raw silica sol was added water, 32% hydrochloric acid and various kinds of metallic salts to prepare a strong acid silica sol having $SiO_2$ 2.2 wt. percent, HCl 9.0 wt. percent and metallic salt 7.0 wt. percent. The coefficient of viscosity and storage stability of said strong acid silica sol are shown in Table 9. On the other hand, the aforesaid silica hydrogel without being changed into a colloidal solution beforehand was mixed with water, 32% hydrochloric acid and various kinds of metallic salts thereby to prepare a strong acid silica sol according to the process mentioned in Example 2. The coefficient of viscosity and storage stability thereof are shown in Table 10.

It will be recognized from the above-described results that a viscosity-increasing effect which salts exert towards a strong acid silica sol is manifested not only when using sodium chloride but also when using other metallic salts, thereby improving the strong acid silica sol liquid in its coefficient of viscosity.

TABLE 9

| Name of metallic salt | Blank | KCl | $CaCl_2$ | $MgCl_2$ | $AlCl_3$ |
|---|---|---|---|---|---|
| Constituents for preparing strong acid silica sol: | | | | | |
| Raw silica sol liquid (g.) | 367 | 367 | 367 | 367 | 367 |
| Metallic salt (g.) | 0 | 70 | 70 | 70 | 70 |
| 32% hydrochloric acid (g.) | 281 | 281 | 281 | 281 | 281 |
| Water (g.) | 352 | 282 | 282 | 282 | 282 |
| Coefficient of viscosity (cp.) | 410 | 485 | 690 | 675 | 980 |
| Storage stability | (1) | (1) | (1) | (1) | (1) |

1 Stable more than 3 months.

TABLE 10

| Name of metallic salt | Blank | KCl | $CaCl_2$ | $MgCl_2$ | $AlCl^3$ |
|---|---|---|---|---|---|
| Conditions for preparing strong acid silica sol: | | | | | |
| Constituents of grinding material: | | | | | |
| Raw silica hydrogel (g.) | 183 | 183 | 183 | 183 | 183 |
| Metallic salt (g.) | 0 | 70 | 70 | 70 | 70 |
| 32% hydrochloric acid (g.) | 281 | 281 | 281 | 281 | 281 |
| Water (g.) | 536 | 466 | 466 | 466 | 466 |
| Grinding time (hr.) | 1 | 1 | 1 | 1 | 1 |
| Coefficient of viscosity (cp.) | 270 | 385 | 530 | 570 | 935 |
| Storage stability | (1) | (1) | (1) | (1) | (1) |

1 Stable more than 3 months.

Example 6

According to the same process as mentioned in Examples 1 and 2, there was prepared a strong acid silica sol by using silica hydrogel obtained by the steps of neutralizing sodium silicate with mineral acid and washing the same with water and using, as the acid, sulfuric acid, nitric acid and a mixed acid of sulfuric acid and hydrochloric acid (the mixed acid of 35 wt. percent HCl and 35 wt. percent $H_2SO_4$). The coefficient of viscosity and storage stability of said strong acid silica sol are shown in Tables 11 and 12. As given in Tables 11 and 12, a strong acid silica sol liquid of high coefficient of viscosity can be prepared even by using a strong acid other than hydrochloric acid.

TABLE 11

| Name of acid | Nitric acid | Sulfuric | Mixed acid |
|---|---|---|---|
| Constituents for preparing strong acid silica sol liquid: | | | |
| Raw silica sol liquid (g.) | 367 | 367 | 367 |
| Acid (g.) | 1 150 | 2 95 | 3 257 |
| Water (g.) | 483 | 538 | 376 |
| Coefficient of viscosity (cp.) | 470 | 360 | 450 |
| Storage stability | (4) | (4) | (4) |

1 60% nitric acid.
2 95% sulfuric acid.
3 35% hydrochloric acid plus 35% sulfuric acid.
4 Stable more than 3 months.

TABLE 12

| Name of acid | Nitric acid | Sulfuric acid | Mixed acid |
|---|---|---|---|
| Conditions for preparing strong acid silica sol liquid: | | | |
| Constituents of grinding material: | | | |
| Raw silica hydrogel (g.) | 183 | 183 | 183 |
| Acid (g.) | 1 150 | 2 95 | 3 257 |
| Water (g.) | 667 | 722 | 560 |
| Grinding time (hr.) | 1 | 1 | 1 |
| Coefficient of viscosity (cp.) | 290 | 250 | 270 |
| Storage stability | (4) | (4) | (4) |

1 60% nitric acid.
2 95% sulfuric acid.
3 35% hydrochloric acid plus 35% sulfuric acid.
4 Stable more than 3 months.

Example 7

The coefficient of viscosity and storage stability of a strong acid silica sol liquid prepared by adding, as a surface active agent, 1.2 wt. percent of cation surface activator such as quaternary ammonium salt, etc. to (1) a strong acid silica sol liquid (coefficient of viscosity 410 cp.) prepared from the silica hydrogel in Example 1 and to (2) a strong acid silica sol liquid prepared from sodium silicate and (3) a strong acid silica sol liquid (coefficient of viscosity 340 cp.) prepared from silica alumina hydrogel in Example 2 and thereafter stirring the same, are shown in Table 13.

TABLE 13

| | (1) | (2) | (3) |
|---|---|---|---|
| Coefficient of viscosity of raw strong acid silica sol liquid (cp.) | 410 | 270 | 340 |
| Constituents for preparation: | | | |
| Raw strong acid silica sol (g.) | 100 | 100 | 100 |
| Surface active agent (g.) (quaternary ammonium salt) | 1.2 | 1.2 | 1.2 |
| Coefficient of viscosity of strong acid silica sol liquid added with surface active agent (cp.) | 1,070 | 810 | 950 |
| Storage stability | (1) | (1) | (1) |

1 Stable for 5 months.

It is recognized from the above-mentioned results that by adding a surface active agent to a strong acid silica sol liquid there can be obtained a strong acid silica sol liquid having a superior coefficient of viscosity and stability.

Example 8

The coefficient of viscosity and storage stability of a strong acid silica sol liquid obtained in case of mix grinding the respective detergent constituents such as silica, hydrochloric acid, a surface active agent (quaternary ammonium salt), sodium chloride and perfume by means of a porcelain pot mill were examined with regard to each of the silica materials. The results are shown in Table 14. The mixing proportion of the constituents is as follows:

| | Wt. percent |
|---|---|
| Silica | *1.6, 2.2 |
| Hydrochloric acid | 9.0 |
| Sodium chloride | 7.0 |
| Quaternary ammonium salt | 1.2 |
| Perfume | 0.1 |

*Calculated in terms of anhydride.

As is clear from the above results, when a final product has been prepared by the use of sodium silicate, silica hydrogel and silica alumina hydrogel, there can be prepared the acid detergent of the same or improved stability as compared with the one prepared in case of using a silica gel prepared by the vapour phase process. It, furthermore, should be said that an important characteristic of the present invention is that the concentration of silica can be lowered by the use of sodium silicate, silica hydrogel and silica alumina hydrogel.

TABLE 14

|  | Sodium silicate | Silica hydrogel | Silica alumina hydrogel | Silica xerogel | Silica gel by vapour phase process |
|---|---|---|---|---|---|
| Silica concentration, 1.6 wt. percent: |  |  |  |  |  |
| Coefficient of viscosity (cp.) | 480 | 530 | 570 | 120 | 280 |
| Storage stability | (1) | (1) | (1) | (2) | (3) |
| Silica concentration, 2.2 wt. percent: |  |  |  |  |  |
| Coefficient of viscosity (cp.) | 1,830 | 2,470 | 3,100 | 250 | 430 |
| Storage stability | (1) | (1) | (1) | (2) | (1) |

[1] Stable more than 5 months.
[2] Separated in 1 day.
[3] Separated in 1 month.

What we claim is:

1. A method of preparing a highly viscous, strongly acidic, detergent-base material, which comprises:
   wet grinding a mixture consisting essentially of (1) water and (2) silica hydrogel or silica alumina hydrogel, said mixture having a pH of about 1 to about 7 and having a silica content of from about 0.5 to about 8 wt. percent, to obtain a silica hydrosol;
   then mixing said hydrosol with a mineral acid selected from the group consisting of hydrochloric acid, sulfuric acid, and nitric acid and mixtures of sulfuric acid and hydrochloric acid, and controlling the water content of said hydrosol, to obtain a highly viscous, strongly acidic silica hydrosol having a silica content in the range of from 0.5 to 5.0 wt. percent and having a mineral acid content in the range of from 3.0 to 20.0 wt. percent.

2. The method of claim 1 including the step of adding to said hydrosol up to 7.0% by weight of a metallic salt selected from the group consisting of sodium chloride, potassium chloride, calcium chloride, magnesium chloride and aluminum chloride.

3. A method of preparing a highly viscous, strongly acidic, detergent-base material, which comprises:
   wet grinding a mixture consisting essentially of (1) water plus a mineral acid selected from the group consisting of hydrochloric acid, sulfuric acid, nitric acid and mixtures of sulfuric acid and hydrochloric acid, and (2) sodium silicate, silica hydrogel or silica alumina hydrogel, said mixture having a pH of about 1 to about 7 and having a silica content of less than about 8 wt. percent, and controlling the mineral acid content and water content of the mixture to obtain a highly viscous, strongly acidic silica hydrosol having a silica content in the range of from 0.5 and 5.0 wt. percent and having a mineral acid content in the range of from 3.0 to 20.0 wt. percent.

4. The method of claim 3 including the step of adding to said hydrosol up to 7.0% by weight of a metallic salt selected from the group consisting of sodium chloride, potassium chloride, calcium chloride, magnesium chloride and aluminum chloride.

References Cited
UNITED STATES PATENTS

| 2,375,738 | 5/1945 | White | 252—313 X |
| 2,085,129 | 6/1937 | Stoewener | 252—313 X |

RICHARD D. LOVERING, Primary Examiner

U.S. Cl. X.R.

252—313 S, 317, 528, DIG. 14